(12) United States Patent
Blanz et al.

(10) Patent No.: US 8,837,337 B2
(45) Date of Patent: Sep. 16, 2014

(54) SIGNALING OF POWER INFORMATION FOR MIMO TRANSMISSION IN A WIRELESS COMMUNICATION SYSTEM

(75) Inventors: Josef J. Blanz, Wachenheim (DE); Ivan Jesus Fernandez-Corbaton, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 721 days.

(21) Appl. No.: 11/971,084

(22) Filed: Jan. 8, 2008

(65) Prior Publication Data

US 2008/0175194 A1 Jul. 24, 2008

Related U.S. Application Data

(60) Provisional application No. 60/884,820, filed on Jan. 12, 2007.

(51) Int. Cl.
*H04B 7/00* (2006.01)
*H04W 52/34* (2009.01)
*H04B 1/707* (2011.01)
*H04J 13/00* (2011.01)

(52) U.S. Cl.
CPC ............. *H04W 52/346* (2013.01); *H04B 1/707* (2013.01); *H04J 13/0044* (2013.01)
USPC ....................................................... 370/310

(58) Field of Classification Search
None
See application file for complete search history.

(56) References Cited

U.S. PATENT DOCUMENTS

| | | | |
|---|---|---|---|
| 6,859,446 B1 | 2/2005 | Gopalakrishnan et al. | |
| 7,197,021 B2 * | 3/2007 | Seo et al. | 370/335 |
| 7,403,513 B2 * | 7/2008 | Lee et al. | 370/342 |
| 7,773,557 B2 * | 8/2010 | Grant et al. | 370/328 |
| 8,477,734 B2 | 7/2013 | Sambhwani et al. | |
| 2002/0009127 A1 * | 1/2002 | Misra et al. | 375/146 |

(Continued)

FOREIGN PATENT DOCUMENTS

| | | |
|---|---|---|
| CN | 1406033 A | 3/2003 |
| CN | 1462124 A | 12/2003 |

(Continued)

OTHER PUBLICATIONS

3rd Generation Partnership Project, "Radio Resource Control (RRC); Protocol Specification", 3GPP TS 25.331 V5.20.0 Sep. 2007.
Pedersen K, et al. "Network Performance of Mixed Traffic on High Speed Downlink Packet Access and Dedicated Channels in WCDMA" Vehicular Technology Conference, 2004. VTC2004-Fall. 2004 IEEE 60th Los Angeles, CA, USA Sep. 26-29, 2004, Piscataway, NJ, USA, pp. 4496-4500.

(Continued)

*Primary Examiner* — Fan Ng
(74) *Attorney, Agent, or Firm* — Eric Ho (57) ABSTRACT

Techniques for signaling power information to facilitate channel quality indicator (CQI) reporting are described. A Node B may send power information that may be used by a UE to determine a power per channelization code, $P_{OVSF}$. In one design, the power information includes a power offset between the power of a data channel, $P_{HSPDSCH}$, and the power of a pilot channel. The Node B may determine $P_{HSPDSCH}$ based on the power available for the data channel, the number of available channelization codes, and a designated number of channelization codes. The UE may determine $P_{OVSF}$ based on the power information from the Node B and the designated number of channelization codes. The UE may estimate at least one SINR of at least one transport block based on $P_{OVSF}$, determine CQI information for the transport block(s) based on the SINR, and send the CQI information to the Node B.

54 Claims, 7 Drawing Sheets

(56) References Cited

U.S. PATENT DOCUMENTS

| | | |
|---|---|---|
| 2003/0123396 A1 | 7/2003 | Seo et al. |
| 2004/0001472 A1* | 1/2004 | Kwak et al. .................. 370/342 |
| 2005/0096080 A1* | 5/2005 | Choi et al. .................. 455/522 |
| 2005/0128973 A1 | 6/2005 | Yagihashi |
| 2005/0181739 A1 | 8/2005 | Krasny et al. |
| 2005/0195885 A1* | 9/2005 | Misra et al. .................. 375/130 |
| 2005/0201474 A1* | 9/2005 | Cho et al. .................... 375/260 |
| 2005/0207367 A1 | 9/2005 | Onggosanusi et al. |
| 2005/0250512 A1 | 11/2005 | Zhang et al. |
| 2006/0030323 A1 | 2/2006 | Ode et al. |
| 2006/0240858 A1* | 10/2006 | Yamazaki et al. ............ 455/522 |
| 2006/0255989 A1 | 11/2006 | Kim et al. |
| 2006/0270433 A1 | 11/2006 | Kelton et al. |
| 2007/0153672 A1 | 7/2007 | Terry et al. |
| 2007/0253508 A1 | 11/2007 | Zhou et al. |
| 2007/0286124 A1* | 12/2007 | Grant et al. .................. 370/331 |
| 2008/0188259 A1* | 8/2008 | Blanz et al. .................. 455/522 |
| 2010/0278152 A1 | 11/2010 | Andreozzi et al. |
| 2011/0286353 A1 | 11/2011 | Blanz et al. |
| 2012/0087271 A1 | 4/2012 | Blanz et al. |

FOREIGN PATENT DOCUMENTS

| | | |
|---|---|---|
| CN | 1812280 A | 8/2006 |
| JP | 2004501549 | 1/2004 |
| JP | 2004343524 A | 12/2004 |
| JP | 2006067099 A | 3/2006 |
| JP | 2007515850 A | 6/2007 |
| JP | 2008539680 | 11/2008 |
| RU | 2003135853 | 4/2005 |
| RU | 2003135858 A | 6/2005 |
| WO | WO0189099 A2 | 11/2001 |
| WO | WO-2005099125 A1 | 10/2005 |
| WO | WO2006116704 A2 | 11/2006 |

OTHER PUBLICATIONS

International Search Report & Written Opinion—PCT/US2008/050543—International Search Authority, European Patent Office—May 16, 2008.

International Search Report & Written Opinion, PCT/US2008/050793, International Search Authority, European Patent Office, Dec. 18, 2008.

Taiwan Search Report—TW097101212—TIPO—May 23, 2011.

European Search Report—EP09165095—Search Authority—Munich—Mar. 6, 2008.

3GPP TS 25.214, V.7.3.0, 3rd Generation Partnership Project; Technical Specification Group Radio Access Network; Physical layer procedures (FDD) (Release 7), Dec. 2006.

European Search Report—EP12167542—Search Authority—Hague—May 31, 2012.

Qualcomm Europe : "Definition of MIMO operation on Hs-PDSCH, preferred precoding and CQI reporting procedures, modified CQI tables", Change Request, 3GPP TSG-RAN WG1 Meeting #48, 3GPP DARFT; R1-070815, St. Luis, Missouri, USA, Feb. 12-16, 2007.

Qualcomm Europe: "CQI reporting for FDD MIMO", 3GPP Draft; R1-070513, 3rd Generation Partnership Project (3GPP), Mobile Competence Centre; 650, Route des Lucioles; F-06921 Sophia-Antipolis Cedex; France, vol. RAN WG1, No. Sorrento, Italy; 20070110, Jan. 10, 2007, XP050104542, [retrieved on Jan. 10, 2007] the whole document.

Qualcomm Europe et al., "Definition of MIMO operation on Hs-PDSCH, preferred precoding and CQI reporting procedures, modified CQI tables", 3GPP Draft; R1-070514, 3rd Generation Partnership Project (3GPP), Mobile Competence Centre; 650, Route des Lucioles; F-86921 Sophia-Antipolis Cedex; France, vol. RAN WG1, No. Sorrento, Italy; 20870110, Jan. 10, 2007, XP050104543, [retrieved on Jan. 18, 2007] the whole document.

\* cited by examiner

SIGNALING OF POWER INFORMATION FOR MIMO TRANSMISSION IN A WIRELESS COMMUNICATION SYSTEM

CLAIM OF PRIORITY UNDER 35 U.S.C. §119

The present application for patent claims priority to Provisional U.S. Application Ser. No. 60/884,820, entitled "Virtual Power Offset Signalling in MIMO," filed Jan. 12, 2007, assigned to the assignee hereof, and expressly incorporated herein by reference.

BACKGROUND

I. Field

The present disclosure relates generally to communication, and more specifically to techniques for signaling power information in a wireless communication system.

II. Background

In a wireless communication system, a Node B may utilize multiple (T) transmit antennas for data transmission to a user equipment (UE) equipped with multiple (R) receive antennas. The multiple transmit and receive antennas form a multiple-input multiple-output (MIMO) channel that may be used to increase throughput and/or improve reliability. For example, the Node B may transmit up to T data streams simultaneously from the T transmit antennas to improve throughput. Alternatively, the Node B may transmit a single data stream from all T transmit antennas to improve reception quality by the UE. Each data stream may carry one transport block of data in a given transmission time interval (TTI). Hence, the terms "data stream" and "transport block" may be used interchangeably.

Good performance (e.g., high throughput) may be achieved by sending each transport block at the highest possible rate that still allows the UE to reliably decode the transport block. The UE may estimate signal-to-interference-and-noise ratios (SINRs) of each possible precoding combination of transport blocks that might be transmitted and may then determine channel quality indicator (CQI) information based on the estimated SINRs of the best precoding combination of transport blocks. The CQI information may convey a set of processing parameters for each transport block. The UE may send the CQI information to the Node B. The Node B may process one or more transport blocks in accordance with the CQI information and send the transport block(s) to the UE.

Data transmission performance may be dependent on accurate determination and reporting of CQI information by the UE. There is therefore a need in the art for techniques to facilitate accurate determination and reporting of CQI information.

SUMMARY

Techniques for signaling power information to facilitate accurate determination and reporting of CQI information for a MIMO transmission are described herein. For a MIMO transmission sent using code division multiplexing, the SINR of a transport block may be dependent on power per channelization code, $P_{OVSF}$, but may not be a linear function of $P_{OVSF}$.

In an aspect, a Node B may send power information that may be used by a UE to determine $P_{OVSF}$, which may then be used for SINR estimation. In one design, the power information comprises a power offset between the power of a data channel, $P_{HSPDSCH}$, and the power of a pilot channel, $P_{CPCH}$. In general, the data channel may comprise any number of channelization codes. $P_{HSPDSCH}$ may be given for a designated number of channelization codes, M, which may be a known value or provided via signaling. The Node B may determine $P_{HSPDSCH}$ based on the power available for the data channel, $\tilde{P}_{HSPDSCH}$, the number of channelization codes available for the data channel, K, and the designated number of channelization codes, M. $P_{HSPDSCH}$ may be greater than $\tilde{P}_{HSPDSCH}$ if the designated number of channelization codes is greater than the number of available channelization codes.

The UE may receive the power information from the Node B and may determine $P_{OVSF}$ based on the power information and the designated number of channelization codes. In one design, the UE may obtain the power offset from the power information and compute $P_{HSPDSCH}$ based on the power offset and the known $P_{CPCH}$. The UE may then distribute $P_{HSPDSCH}$ across at least one transport block and also across the designated number of channelization codes to obtain $P_{OVSF}$. The UE may estimate the SINR of each transport block based on $P_{OVSF}$ and then determine CQI information for the at least one transport block based on the SINR of each transport block. The UE may send the CQI information to the Node B.

The Node B may receive the CQI information from the UE and may send at least one transport block in a MIMO transmission to the UE. In one design, the Node B may send the transport block(s) with the designated number of channelization codes and at $P_{OVSF}$ or higher. In another design, the Node B may send the transport block(s) with K available channelization codes at $P_{OVSF}$ or higher and may scale the size of the transport block(s) based on the designated number of channelization codes, M, and the number of available channelization codes, K. In yet another design, the Node B may scale $P_{OVSF}$ based on K and M and may then send the transport block(s) with the K available channelization codes at the scaled $P_{OVSF}$.

Various aspects and features of the disclosure are described in further detail below.

DETAILED DESCRIPTION

The techniques described herein may be used for various wireless communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. The terms "system" and "network" are often used interchangeably. A CDMA system may implement a radio technology such Universal Terrestrial Radio Access (UTRA), cdma2000, etc. UTRA includes Wideband-CDMA (W-CDMA) and other CDMA variants. cdma2000 covers IS-2000, IS-95 and IS-856 standards. UTRA is part of Universal Mobile Telecommunication System (UMTS), and both are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, the techniques are described below for UMTS, and UMTS terminology is used in much of the description below.

Figure 1:
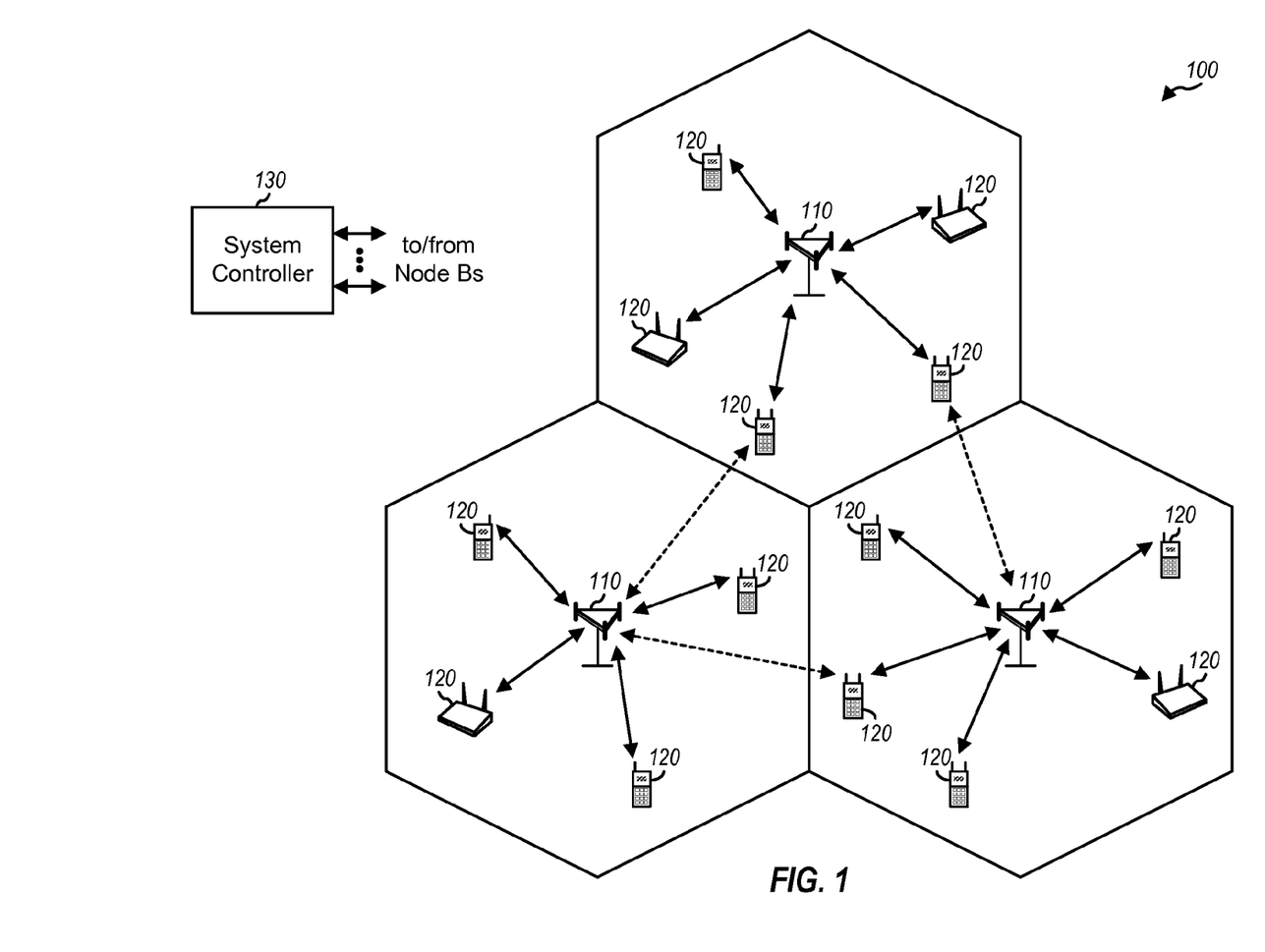
FIG. 1 shows a wireless communication system.

FIG. 1 shows a wireless communication system 100 with multiple Node Bs 110 and multiple UEs 120. System 100 may also be referred to as a Universal Terrestrial Radio Access Network (UTRAN) in UMTS. A Node B is generally a fixed station that communicates with the UEs and may also be referred to as an evolved Node B (eNode B), a base station, an access point, etc. Each Node B 110 provides communication coverage for a particular geographic area and supports communication for the UEs located within the coverage area. A system controller 130 couples to Node Bs 110 and provides coordination and control for these Node Bs. System controller 130 may be a single network entity or a collection of network entities.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless device, a handheld device, a wireless modem, a laptop computer, etc.

Figure 2:
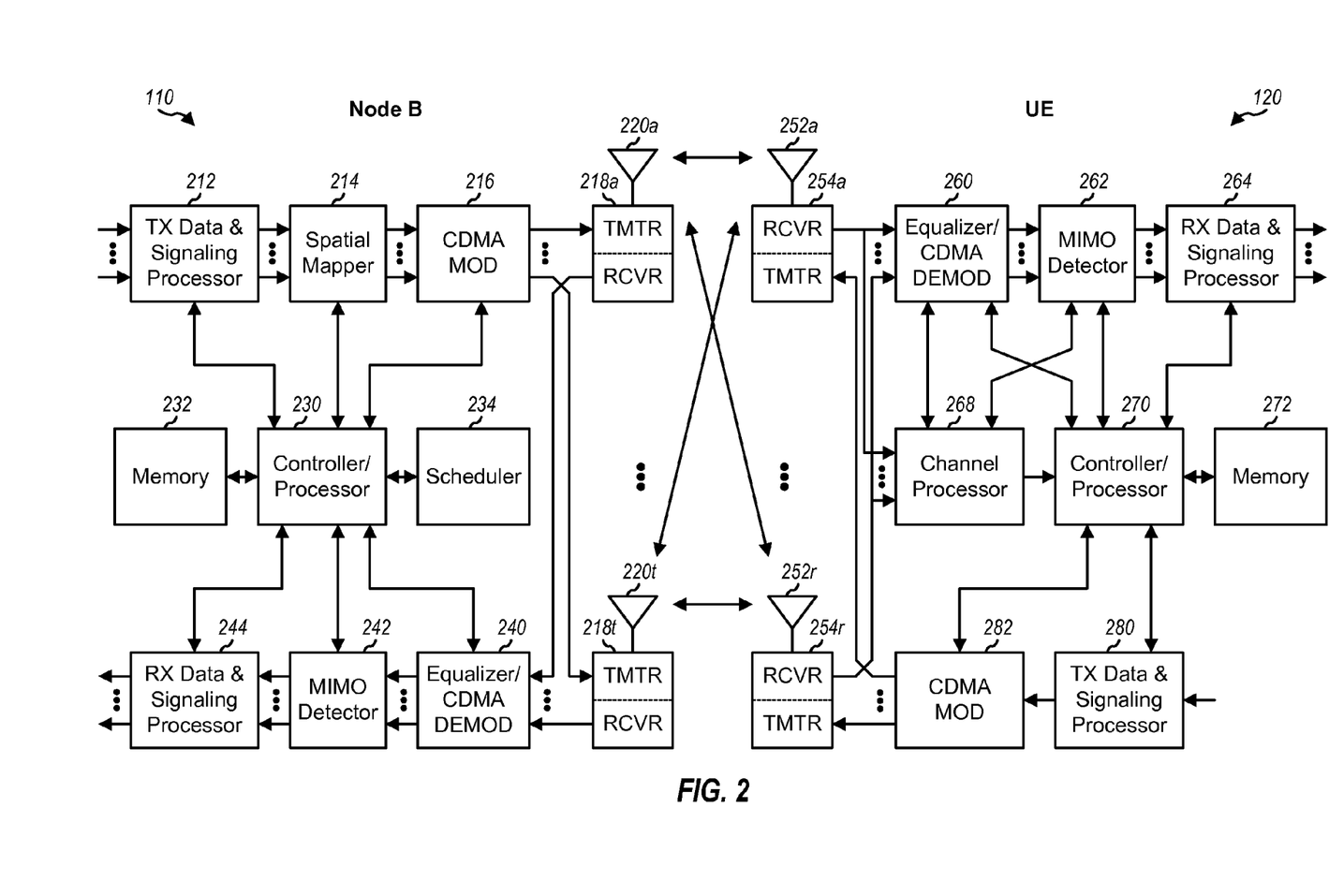
FIG. 2 shows a block diagram of a Node B and a UE.

FIG. 2 shows a block diagram of a design of one Node B 110 and one UE 120. In this design, Node B 110 is equipped with multiple (T) antennas 220a through 220t, and UE 120 is equipped with multiple (R) antennas 252a through 252r. A MIMO transmission may be sent from the T transmit antennas at Node B 110 to the R receive antennas at UE 120.

At Node B 110, a transmit (TX) data and signaling processor 212 may receive data from a data source (not shown) for all scheduled UEs. Processor 212 may process (e.g., format, encode, interleave, and symbol map) the data for each UE and provide data symbols, which are modulation symbols for data. Processor 212 may also process signaling (e.g., power information) and provides signaling symbols, which are modulation symbols for signaling. A spatial mapper 214 may precode the data symbols for each UE based on a precoding matrix or vector for that UE and provide output symbols for all UEs. A CDMA modulator (MOD) 216 may perform CDMA processing on the output symbols and signaling symbols and may provide T output chip streams to T transmitters (TMTR) 218a through 218t. Each transmitter 218 may process (e.g., convert to analog, filter, amplify, and frequency upconvert) its output chip stream and provide a downlink signal. T downlink signals from T transmitters 218a through 218t may be sent via T antennas 220a through 220t, respectively.

At UE 120, R antennas 252a through 252r may receive the downlink signals from Node B 110 and provide R received signals to R receivers (RCVR) 254a through 254r, respectively. Each receiver 254 may process (e.g., filter, amplify, frequency downconvert, and digitize) its received signal and provide samples to a channel processor 268 and an equalizer/CDMA demodulator (DEMOD) 260. Processor 268 may derive coefficients for a front-end filter/equalizer and coefficients for one or more combiner matrices for equalizer/CDMA demodulator 260. Unit 260 may perform equalization with the front-end filter and CDMA demodulation and may provide filtered symbols. A MIMO detector 262 may combine the filtered symbols across spatial dimension and provide detected symbols, which are estimates of the data symbols and signaling symbols sent to UE 120. A receive (RX) data and signaling processor 264 may process (e.g., symbol demap, deinterleave, and decode) the detected symbols and provide decoded data and signaling. In general, the processing by equalizer/CDMA demodulator 260, MIMO detector 262, and RX data and signaling processor 264 is complementary to the processing by CDMA modulator 216, spatial mapper 214, and TX data and signaling processor 212, respectively, at Node B 110.

Channel processor 268 may estimate the response of the wireless channel from Node B 110 to UE 120. Processor 268 and/or 270 may process the channel estimate and/or the derived coefficients to obtain feedback information, which may include precoding control indicator (PCI) information and CQI information. The PCI information may convey the number of transport blocks to send in parallel and a specific precoding matrix or vector to use for precoding the transport block(s). A transport block may also be referred to as a packet, a data block, etc. The CQI information may convey processing parameters (e.g., the transport block size and modulation scheme) for each transport block. Processor 268 and/or 270 may evaluate different possible precoding matrices and vectors that can be used for data transmission and may select a precoding matrix or vector that can provide the best performance, e.g., the highest overall throughput. Processor 268 and/or 270 may also determine the CQI information for the selected precoding matrix or vector.

The feedback information and data to send on the uplink may be processed by a TX data and signaling processor 280, further processed by a CDMA modulator 282, and conditioned by transmitters 254a through 254r to generate R uplink signals, which may be transmitted via antennas 252a through 252r, respectively. The number of transmit antennas at UE 120 may or may not be equal to the number of receive antennas. For example, UE 120 may receive data using two antennas but may transmit the feedback information using only one antenna. At Node B 110, the uplink signals from UE 120 may be received by antennas 220a through 220t, conditioned by receivers 218a through 218t, processed by an equalizer/CDMA demodulator 240, detected by a MIMO detector 242, and processed by an RX data and signaling processor 244 to recover the feedback information and data sent by UE 120. The number of receive antennas at Node B 110 may or may not match the number of transmit antennas.

Controllers/processors 230 and 270 may direct the operation at Node B 110 and UE 120, respectively. Memories 232 and 272 may store program code and data for Node B 110 and UE 120, respectively. A scheduler 234 may schedule UEs for downlink and/or uplink transmission, e.g., based on the feedback information received from the UEs.

In UMTS, data for a UE may be processed as one or more transport channels at a higher layer. The transport channels may carry data for one or more services such as voice, video, packet data, etc. The transport channels may be mapped to physical channels at a physical layer. The physical channels may be channelized with different channelization codes and may thus be orthogonal to one another in the code domain. UMTS uses orthogonal variable spreading factor (OVSF) codes as the channelization codes for the physical channels.

3GPP Release 5 and later supports High-Speed Downlink Packet Access (HSDPA), which is a set of channels and procedures that enable high-speed packet data transmission on the downlink. For HSDPA, a Node B may send data on a High Speed Downlink Shared Channel (HS-DSCH), which is a downlink transport channel that is shared by all UEs in both time and code. The HS-DSCH may carry data for one or more UEs in each TTI. For UMTS, a 10 millisecond (ms) radio frame is partitioned into five 2-ms subframes, each subframe includes three slots, and each slot has a duration of 0.667 ms. A TTI is equal to one subframe for HSDPA and is the smallest unit of time in which a UE may be scheduled and served. The sharing of the HS-DSCH may change dynamically from TTI to TTI.

Table 2 lists some downlink and uplink physical channels used for HSDPA and provides a short description for each physical channel.

TABLE 1

| Link | Channel | Channel Name | Description |
| --- | --- | --- | --- |
| Downlink | HS-PDSCH | High Speed Physical Downlink Shared Channel | Carry data sent on the HS-DSCH for different UEs. |
| Downlink | HS-SCCH | Shared Control Channel for HS-DSCH | Carry signaling for the HS-PDSCH. |
| Uplink | HS-DPCCH | Dedicated Physical Control Channel for HS-DSCH | Carry feedback for downlink transmission in HSDPA. |

Figure 3:
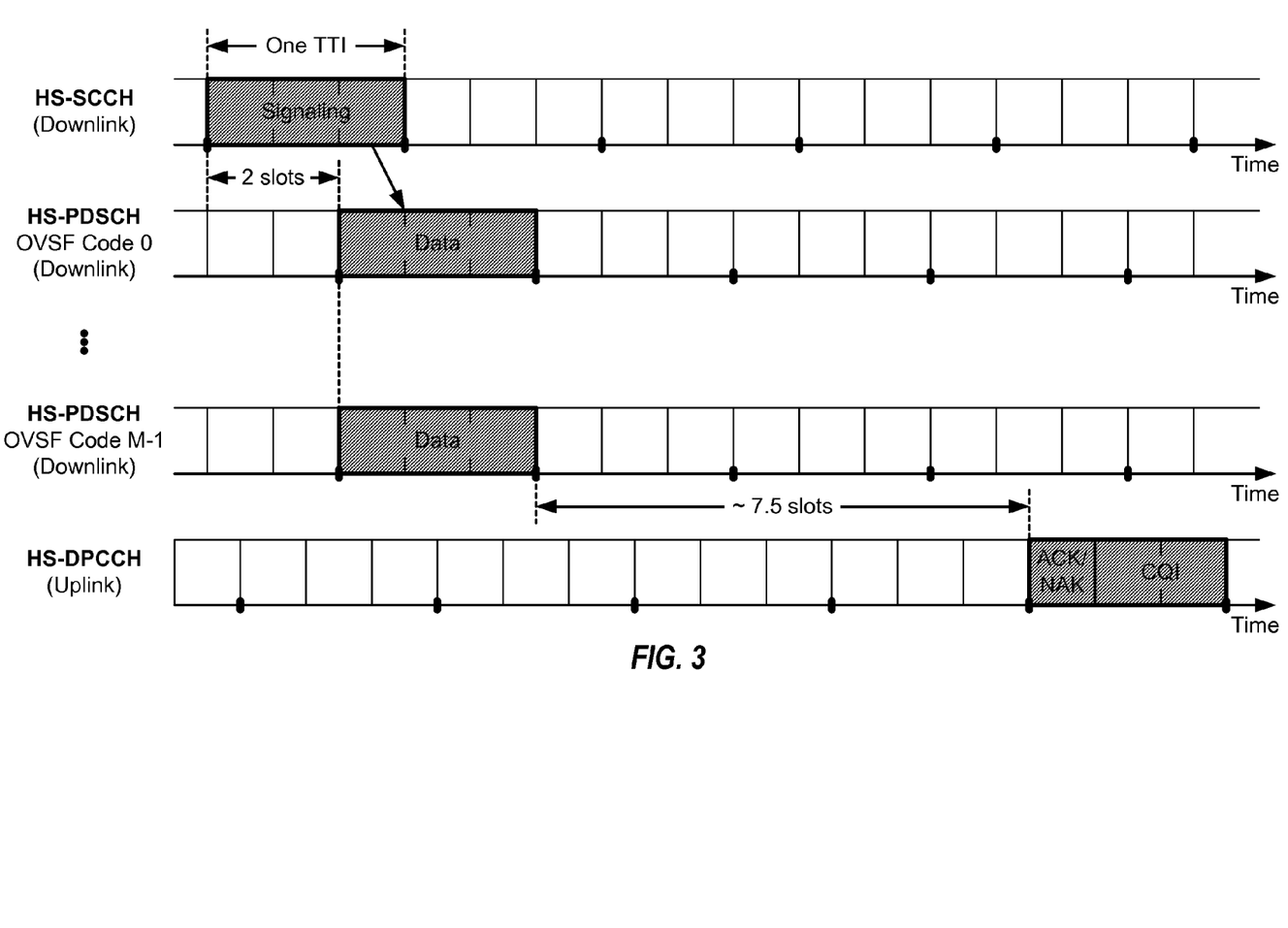
FIG. 3 shows a timing diagram for a set of physical channels.

FIG. 3 shows a timing diagram for the physical channels used for HSDPA. For HSDPA, a Node B may serve one or more UEs in each TTI. The Node B may send signaling for each scheduled UE on the HS-SCCH and may send data on the HS-PDSCH two slots later. The Node B may use a configurable number of 128-chip OVSF codes for the HS-SCCH and may use up to fifteen 16-chip OVSF codes for the HS-PDSCH. HSDPA may be considered as having a single HS-PDSCH with up to fifteen 16-chip OVSF codes and a single HS-SCCH with a configurable number of 128-chip OVSF codes. Equivalently, HSDPA may be considered as having up to fifteen HS-PDSCHs and a configurable number of HS-SCCHs, with each HS-PDSCH having a single 16-chip OVSF code and each HS-SCCH having a single 128-chip OVSF code. The following description uses the terminology of a single HS-PDSCH and a single HS-SCCH.

Each UE that might receive data on the HS-PDSCH may process up to four 128-chip OVSF codes for the HS-SCCH in each TTI to determine whether signaling has been sent for that UE. Each UE that is scheduled in a given TTI may process the HS-PDSCH to recover data sent to that UE. Each scheduled UE may send either an acknowledgement (ACK) on the HS-DPCCH if a transport block is decoded correctly or a negative acknowledgement (NACK) otherwise. Each UE may also send PCI and CQI information on the HS-DPCCH to the Node B.

FIG. 3 also shows timing offsets between the HS-SCCH, the HS-PDSCH, and the HS-DPCCH at a UE. The HS-PDSCH starts two slots after the HS-SCCH. The HS-DPCCH starts approximately 7.5 slots from the end of the corresponding transmission on the HS-PDSCH.

A UE may send CQI information to allow a Node B to appropriately process and transmit data to the UE. In general, CQI information may be sent for any number of transport blocks or data streams. For clarity, much of the description below assumes that one or two transport blocks may be sent in a given TTI and that the CQI information may be for one or two transport blocks.

The Node B may transmit two transport blocks to the UE using one of multiple possible precoding matrices or may transmit a single transport block using one column/vector of one of the possible precoding matrices. The UE may evaluate data performance for different possible precoding matrices and vectors that can be used by the Node B for data transmission to the UE. For each precoding matrix or vector, the UE may estimate the quality of each transport block, which may be given by any suitable metric. For clarity, the following description assumes that the quality of each transport block is given by an equivalent SINR for an additive white Gaussian noise (AWGN) channel, which is referred to as simply SINR in the description below. The UE may determine data performance (e.g., the overall throughput) for each preceding matrix or vector based on the SINR(s) of all transport block(s). After evaluating all possible preceding matrices and vectors, the UE may select the preceding matrix or vector that provides the best data performance.

For each possible precoding matrix, the UE may estimate the SINRs of two transport blocks that may be sent in parallel with that preceding matrix. The transport block with the higher SINR may be referred to as the primary transport block, and the transport block with the lower SINR may be referred to as the secondary transport block. The SINR of each transport block may be dependent on various factors such as (i) the total power of the HS-PDSCH, (ii) the number of OVSF codes used for the HS-PDSCH, (iii) channel conditions, which may be given by channel gains and noise variance, (iv) the type of receiver processing performed by the UE, (v) the order in which the transport blocks are recovered if successive interference cancellation (SIC) is performed by the UE, and (vi) possibly other factors.

The SINR of transport block i, $SINR_i$, may be given as:

$$SINR_i = F(P_{OVSF}, X_i), \quad\quad\quad Eq(1)$$

where $P_{OVSF}$ is the power per OVSF code for the HS-PDSCH, $X_i$ includes all other parameters that affect SINR, and $F(\ )$ is an SINR function applicable for the UE.

The SINR function may be dependent on the receiver processing at the UE and may not be a linear function of $P_{OVSF}$. Thus, if $P_{OVSF}$ increases by G decibel (dB), then the amount of improvement in SINR may not be accurately known based solely on the G dB increase in $P_{OVSF}$. This non-linear relationship between $P_{OVSF}$ and SINR may be due to code-reuse interference, which is interference between two transport blocks using the same OVSF codes. Furthermore, the SINR function may not be known at the Node B.

In an aspect, the Node B may send power information that may be used by the UE to determine the power per OVSF code, $P_{OVSF}$, to use for SINR estimation. The power information may be given in various forms and may be based on certain assumptions. In one design, the power information comprises a power offset that is indicative of the difference between the power of the HS-PDSCH, $P_{HSPDSCH}$, and the power of a reference channel. The reference channel may be a Common Pilot Channel (CPICH) or some other channel having known power. In one design, the power of the HS-PDSCH, $P_{HSPDSCH}$, may be determined as follows:

$$P_{HSPDSCH} = P_{CPICH} + \Gamma, \text{ in dB}, \quad\quad\quad Eq(2)$$

where $P_{CPICH}$ is the power of the CPICH, and $\Gamma$ is the power offset that may be signaled by the Node B.

The Node B may signal the power offset $\Gamma$ to the UE, as described below. At the Node B, $P_{HSPDSCH}$ is the transmit power of the HS-PDSCH, and $P_{CPICH}$ is the transmit power of the CPICH. At the UE, $P_{HSPDSCH}$ is the received power of the HS-PDSCH, and $P_{CPICH}$ is the received power of the CPICH. The UE may be able to determine $P_{HSPDSCH}$ based on the signaled power offset $\Gamma$, as shown in equation (2).

The Node B and UE may compute $P_{OVSF}$ in the same manner based on the available information so that the power per OVSF code used by the Node B for data transmission can meet or exceed the $P_{OVSF}$ used by the UE for SINR estimation. $P_{OVSF}$ may be computed in various manners. In one design, $P_{HSPDSCH}$ may be distributed evenly to all transport blocks, and $P_{OVSF}$ may then be the same for all transport blocks. In another design, a particular percentage of $P_{HSPDSCH}$ may be distributed to the primary transport block, the remaining percentage of $P_{HSPDSCH}$ may be distributed to the secondary transport block, and $P_{OVSF}$ may be different for the two transport blocks.

In one design, $P_{OVSF}$ may be computed based on a designated number of OVSF codes, M. In one design, the Node B may provide M via higher layer signaling and/or some other mechanism, e.g., on a regular basis or whenever there is a change. In another design, M may be equal to the maximum number of OVSF codes for the HS-PDSCH (i.e., M=15) or equal to some other predetermined/known value. In any case, $P_{OVSF}$ may be obtained by uniformly distributing $P_{HSPDSCH}$ across the M OVSF codes, as follows:

$$P_{OVSF} = P_{HSPDSCH} - 10 \cdot \log_{10}(M), \text{ in dB} \qquad \text{Eq (3)}$$

In equation (3), subtraction in dB is equivalent to division in linear unit.

Table 2 lists some parameters used in the description herein and provides a short description for each parameter.

TABLE 2

| Symbol | Description |
|---|---|
| $P_{HSPDSCH}$ | Power computed by the UE and Node B based on the power offset $\Gamma$ and $P_{CPICH}$, which are known to both entities. |
| $\tilde{P}_{HSPDSCH}$ | Power available at the Node for the HS-PDSCH. |
| $P_{OVSF}$ | Power per OVSF code computed by the UE and Node B based on the power offset $\Gamma$ and $P_{CPICH}$. |
| $\tilde{P}_{OVSF}$ | Power per OVSF code available at the Node B for the HS-PDSCH. |

In general, $P_{HSPDSCH}$ may be equal to, less than, or greater than $\tilde{P}_{HSPDSCH}$. $P_{HSPDSCH}$ and $P_{OVSF}$ may be referred to as signaled or computed values, and $\tilde{P}_{HSPDSCH}$ and $\tilde{P}_{OVSF}$ may be referred to as available values.

The Node B may have K OVSF codes available for the HS-PDSCH, where K may or may not be equal to the designated number of OVSF codes. The Node B may scale the power offset $\Gamma$ based on the number of available OVSF codes and the designated number of OVSF codes.

Figure 4:
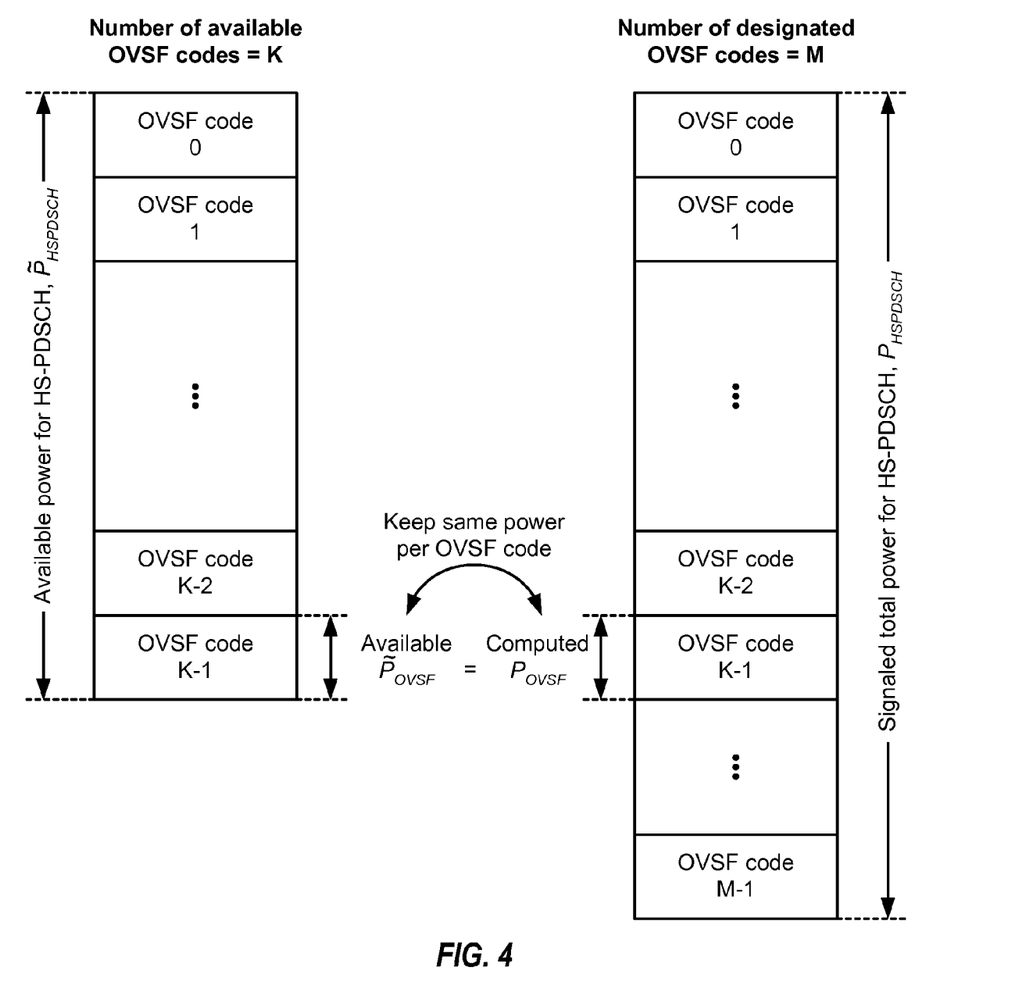
FIG. 4 shows scaling of the power offset by the Node B.

FIG. 4 shows scaling of the power offset by the Node B. The Node B may have K available OVSF codes for the HS-PDSCH, where $1 \leq K < M$ for the example shown in FIG. 4. The Node B may also have $\tilde{P}_{HSPDSCH}$ available for the HS-PD-SCH. The Node B may compute $\tilde{P}_{OVSF}$ by distributing $\tilde{P}_{HSPDSCH}$ uniformly across K available OVSF codes, as follows:

$$\tilde{P}_{OVSF} = \tilde{P}_{HSPDSCH} - 10 \cdot \log_{10}(K), \text{ in dB} \qquad \text{Eq (4)}$$

The Node B may set $P_{OVSF}$ equal to $\tilde{P}_{OVSF}$. The Node B may then compute $P_{HSPDSCH}$ such that $P_{OVSF}$ is obtained for each of the M designated OVSF codes, as follows:

$$\begin{aligned} P_{HSPDSCH} &= \tilde{P}_{OVSF} + 10 \cdot \log_{10}(M) \\ &= \tilde{P}_{HSPDSCH} + 10 \cdot \log_{10}(M/K), \text{ in dB} \end{aligned} \qquad \text{Eq (5)}$$

The Node B may then compute the power offset based on the computed $P_{HSPDSCH}$ and the known $P_{CPICH}$, as follows:

$$\Gamma = \tilde{P}_{HSPDSCH} - P_{CPICH}, \text{ in dB} \qquad \text{Eq (6)}$$

If K is less than M, as shown in FIG. 4, then the computed $P_{HSPDSCH}$ may be larger than the available $\tilde{P}_{HSPDSCH}$ at the Node B. If K is greater than M (not shown in FIG. 4), then the computed $P_{HSPDSCH}$ may be smaller than the available $\tilde{P}_{HSPDSCH}$. In any case, since $\tilde{P}_{HSPDSCH}$ may or may not be equal to $P_{HSPDSCH}$, the power offset $\Gamma$ may be considered as a virtual or hypothetical power offset used for computation of $P_{OVSF}$ based on the designated number of OVSF codes.

The Node B may send the power information used to determine $P_{OVSF}$ in various manners. In one design, the Node B may send the power information via higher layer signaling and/or some other mechanism, e.g., on a regular basis or whenever there is a change.

Figure 5:
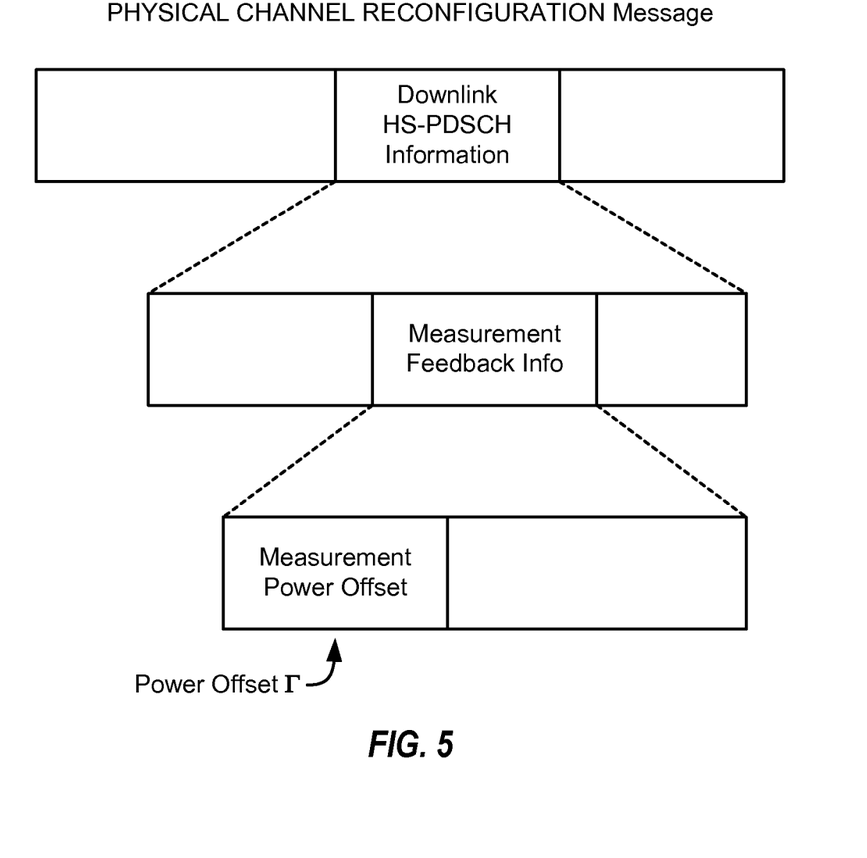
FIG. 5 shows a mechanism for sending the power offset by the Node B.

FIG. 5 shows a mechanism for sending the power offset $\Gamma$ using a Radio Resource Control (RRC) message in UMTS. The Node B may send a PHYSICAL CHANNEL RECONFIGURATION message to the UE in order to assign, replace or release a set of physical channels used by the UE. This message may include a number of information elements (IEs), one of which may be a Downlink HS-PDSCH Information IE that may carry information for the HS-PDSCH. The Downlink HS-PDSCH Information IE may include a Measurement Feedback Info IE that may carry information affecting feedback information sent by the UE on the uplink to the Node B. The Measurement Feedback Info IE may include a Measurement Power Offset parameter, which may be set to the power offset $\Gamma$ computed as shown in equation (6). The power offset $\Gamma$ may also be sent in other RRC messages to the UE. The RRC messages and IEs are described in 3GPP TS 25.331, entitled "Radio Resource Control (RRC)," dated September 2007, which is publicly available.

The Node B may also send the power offset $\Gamma$ in other manners. The Node B may also send other types of information to allow the UE to compute $P_{OVSF}$. In general, the Node B may send a relative value (e.g., the power offset) or an absolute value (e.g., $P_{HSPDSCH}$) for the computation of $P_{OVSF}$. The Node B may send the power information when a link for the UE is set up, is changed, etc.

The UE may receive the power information (e.g., the power offset) from the Node B and may compute $P_{OVSF}$ based on the power information and other known information. The UE may then use $P_{OVSF}$ to determine CQI information.

Figure 6:
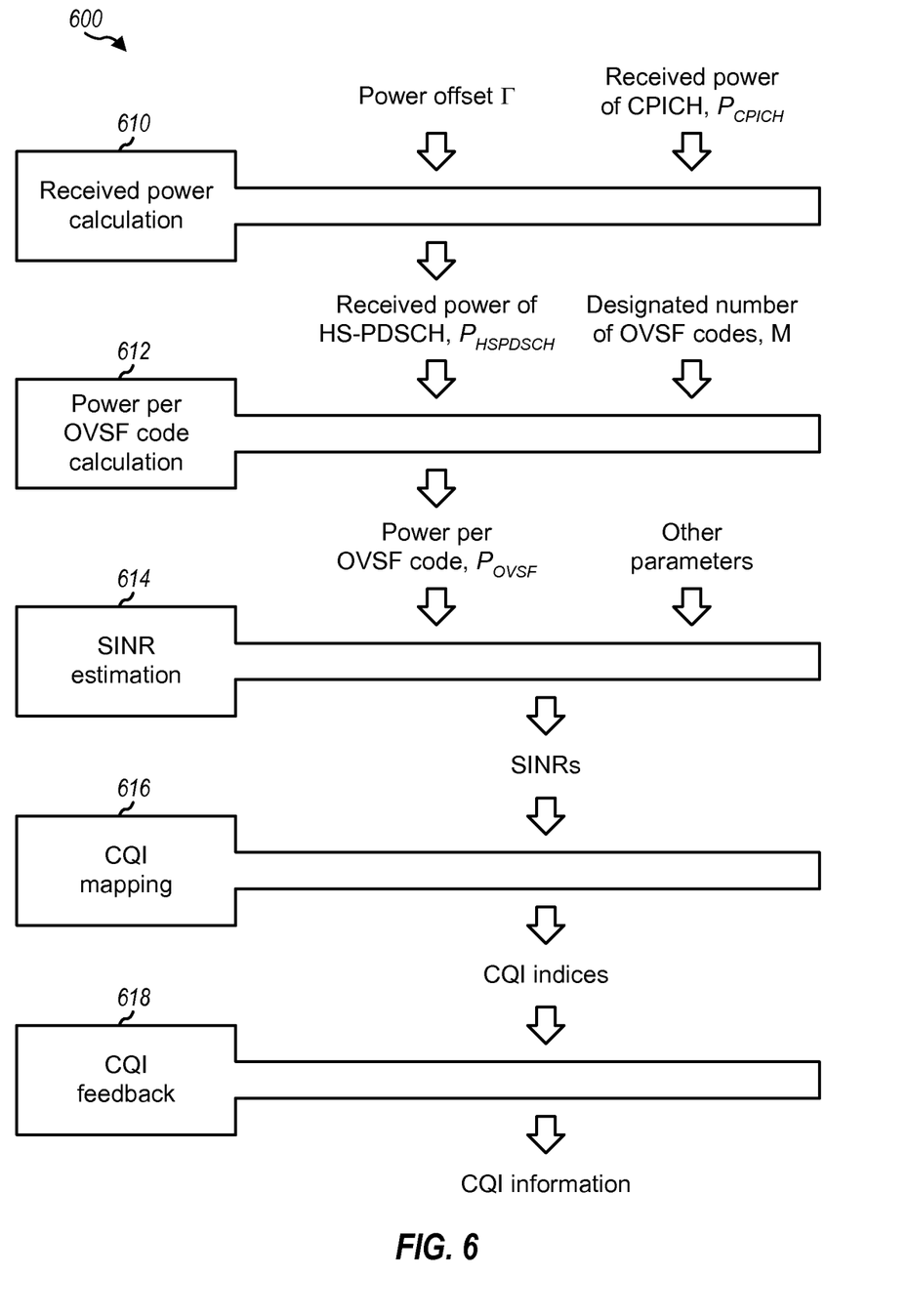
FIG. 6 shows a process for determining CQI information by the UE.

FIG. 6 shows a process 600 for determining CQI information for multiple (e.g., two) transport blocks. The UE may compute the received power of the HS-PDSCH, $P_{HSPDSCH}$, based on the power offset $\Gamma$ received from the Node B and the received power of the CPICH, $P_{CPICH}$, e.g., as shown in equation (2) (block 610). The UE may next compute $P_{OVSF}$ based on $P_{HSPDSCH}$ and the designated number of OVSF codes, e.g., as shown in equation (3) (block 612). The UE may estimate the SINR of each transport block based on $P_{OVSF}$ and other parameters and in accordance with an SINR function (block 614).

The UE may map the SINR of each transport block to a CQI index based on a CQI mapping table (block 616). The CQI mapping table may have L entries for L possible CQI levels, where L may be any suitable value. Each CQI level may be associated with a set of parameters for a transport block as well as a required SINR. The set of parameters may include a transport block size, a modulation scheme, a code rate, etc. The L CQI levels may be associated with increasing required SINRs. For each transport block, the UE may select the highest CQI level with a required SINR that is lower than the estimated SINR of that transport block. The CQI index for each transport block may indicate one of L possible CQI levels. The UE may send the CQI indices to the Node B (block 618). The Node B may transmit transport blocks to the UE based on the CQI indices received from the UE.

In one design, symmetric OVSF code allocation is employed, and the same number and same set of OVSF codes is used for two transport blocks. In this design, the CQI mapping table may be defined such that the same number of OVSF codes is used for all CQI levels. In another design, asymmetric OVSF code allocation is allowed, and the number of OVSF codes for the secondary transport block may be different (e.g., fewer) than the number of OVSF codes for the primary transport block. In this design, the CQI mapping table may have different numbers of OVSF codes for different CQI levels, e.g., fewer OVSF codes for one or more of the lowest CQI levels. The secondary transport block may be sent with a subset of the OVSF codes used for the primary transport block.

If a precoding matrix is selected, then the UE may separately determine two CQI indices for two transport blocks to be sent in parallel with the selected precoding matrix. If a precoding vector is selected, then the UE may determine one CQI index for one transport block to be sent with the selected precoding vector. The UE may send a single CQI value that can convey either one CQI index for one transport block or two CQI indices for two transport blocks. With a granularity of 15 CQI levels for each CQI index in the case of two transport blocks, a total of 15×15=225 CQI index combinations are possible for two transport blocks. If 8 bits are used for the single CQI value, then up to 256−225=31 levels may be used for the CQI index for one transport block.

In one design, the single CQI value may be determined as follows:

$$CQI = \begin{cases} 15 \times CQI_1 + CQI_2 + 31 & \text{when 2 transport blocks are preferred by the } UE \\ CQI_s & \text{when 1 transport block is preferred by the } UE \end{cases} \quad \text{Eq (7)}$$

where $CQI_S$ is a CQI index within {0 ... 30} for one transport block, $CQI_1$ is a CQI index within {0 ... 14} for the primary transport block, $CQI_2$ is a CQI index within {0 ... 14} for the secondary transport block, and CQI is an 8-bit CQI value for one or two transport blocks.

In the design shown in equation (7), a CQI value within a range of 0 through 30 is used to convey a CQI index for one transport block, and a CQI value within a range of 31 through 255 is used to convey two CQI indices for two transport blocks. The UE may also map the CQI index or indices for one or two transport blocks to a single CQI value in other manners.

In one design, the UE may send a PCI/CQI report that may include two bits for PCI information and 8 bits for CQI information. The PCI information may convey a precoding matrix or vector selected by the UE. The CQI information may comprise one 8-bit CQI value computed as shown in equation (7). The ten bits for the PCI/CQI report may be channel encoded with a (20, 10) block code to obtain a codeword of 20 code bits. The 20 code bits for the PCI/CQI report may be spread and sent on the HS-DPCCH in the second and third slots of the TTI, which are labeled as "CQI" in FIG. 3.

The Node B may receive the PCI/CQI report from the UE and determine whether the UE prefers one or two transport blocks and the CQI index for each preferred transport block based on the reported CQI value. The Node B may transmit the number of transport blocks preferred by the UE or fewer transport blocks. For example, if the UE prefers two transport blocks, then the Node B may transmit zero, one, or two transport blocks to the UE.

The UE may determine the CQI index for each transport block based on $P_{OVSF}$, which may be obtained based on the designated number of OVSF codes, M. The Node B may have K OVSF codes available for the HS-PDSCH, where K may or may not be equal to M. The Node B may transmit data to the UE in various manners depending on K, M, $P_{OVSF}$ and the available $\tilde{P}_{HSPDSCH}$ at the Node B.

If K=M, then the Node B may transmit each transport block with the K available OVSF codes at $P_{OVSF}$ or higher to the UE.

If K<M, then in one design the Node B may scale down the transport block size by a factor of K/M and may transmit a transport block of a smaller size with the K available OVSF codes at $P_{OVSF}$ or higher to the UE. For example, if K=10, M=15, and a transport block size of S is selected by the UE, then the Node B may transmit a transport block of size 10·S/15 with 10 OVSF codes at $P_{OVSF}$ to the UE. This design may ensure that the SINR of the transmitted transport block closely matches the SINR estimated by the UE since the same $P_{OVSF}$ is used for both SINR estimation by the UE and data transmission by the Node B. In another design, the Node B may scale up $P_{OVSF}$ by a factor of up to M/K and may then transmit a transport block of size S or larger at the higher $P_{OVSF}$ to the UE. The Node B may predict the improvement in SINR with the higher $P_{OVSF}$ and may select the transport block size accordingly.

If K>M, then in one design the Node B may scale up the transport block size by a factor of K/M and may transmit a transport block of a larger size of K·S/M with the K available OVSF codes at $P_{OVSF}$ or higher to the UE. In another design, the Node B may scale down $P_{OVSF}$ by a factor of up to M/K and may then transmit a transport block of size S or smaller at the lower $P_{OVSF}$ to the UE.

In general, the Node B may select the number of OVSF codes to use for the HS-PDSCH based on K, M, $\tilde{P}_{HSPDSCH}$ and $P_{HSPDSCH}$ such that $P_{OVSF}$ or higher can be used for each OVSF code. The Node B may transmit each transport block with up to K available OVSF codes at $P_{OVSF}$ or higher. The Node B may scale the transport block size based on the number of OVSF codes used for the HS-PDSCH and the designated number of OVSF codes used to determine CQI.

Figure 7:
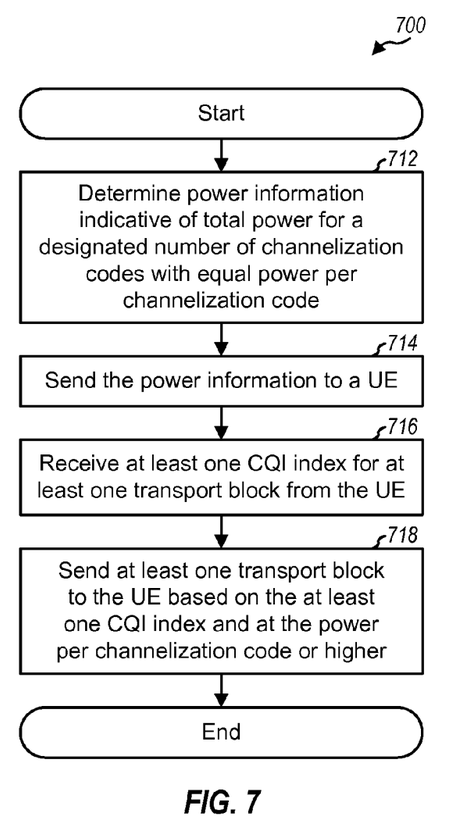
FIG. 7 shows a process performed by the Node B.

FIG. 7 shows a design of a process 700 performed by the Node B (or a transmitter). Power information indicative of total power, $P_{HSPDSCH}$, for a designated number of channelization codes, M, with equal power per channelization code, $P_{OVSF}$, may be determined (block 712). In one design, the power information may comprise a power offset between the total power for the designated number of channelization codes for a data channel and the power of a pilot channel, $P_{CPICH}$. The designated number of channelization codes may be the maximum number of channelization codes available for data transmission, which is 15 for the HS-PDSCH. The designated number of channelization codes may also be a fixed number of channelization codes that is known a priori by the UE.

In one design of block 712, the power available for the data channel, $\tilde{P}_{HSPDSCH}$, and the number of channelization codes available for the data channel, K, may be determined. The power per channelization code, $\tilde{P}_{OVSF}$, for the number of available channelization codes may be determined based on the available power, $\tilde{P}_{HSPDSCH}$. The total power of the data channel, $P_{HSPDSCH}$, may then be computed based on the designated number of channelization codes and the power per channelization code, $\tilde{P}_{OVSF}$, e.g., as shown in equation (5). The power offset may then be determined based on the total power of the data channel, $P_{HSPDSCH}$, and the power of the pilot channel, $P_{CPICH}$, e.g., as shown in equation (6). The total power $P_{HSPDSCH}$ determined based on the power information may be greater than or less than the available power $\tilde{P}_{HSPDSCH}$. The power information may be sent to the UE, e.g., in an RRC message or via some other means (block 714).

At least one CQI index for at least one transport block may be received from the UE, with the at least one CQI index being determined by the UE based on the power per channelization code, $P_{OVSF}$ (block 716). At least one transport block may be sent to the UE based on the at least one received CQI index (block 718). In one design, the transport block(s) may be sent with the designated number of channelization codes and at the power per channelization code, $P_{OVSF}$, or higher to the UE. In another design, the transport block(s) may be scaled based on the designated number of channelization codes and the number of available channelization codes. The transport block(s) may then be sent with the number of available channelization codes and at the power per channelization code, $P_{OVSF}$, or higher to the UE. In yet another design, the power per channelization code may be scaled based on the designated number of channelization codes and the number of available channelization codes. The transport block(s) may then be sent with the number of available channelization codes and at the scaled power per channelization code to the UE.

Figure 8:
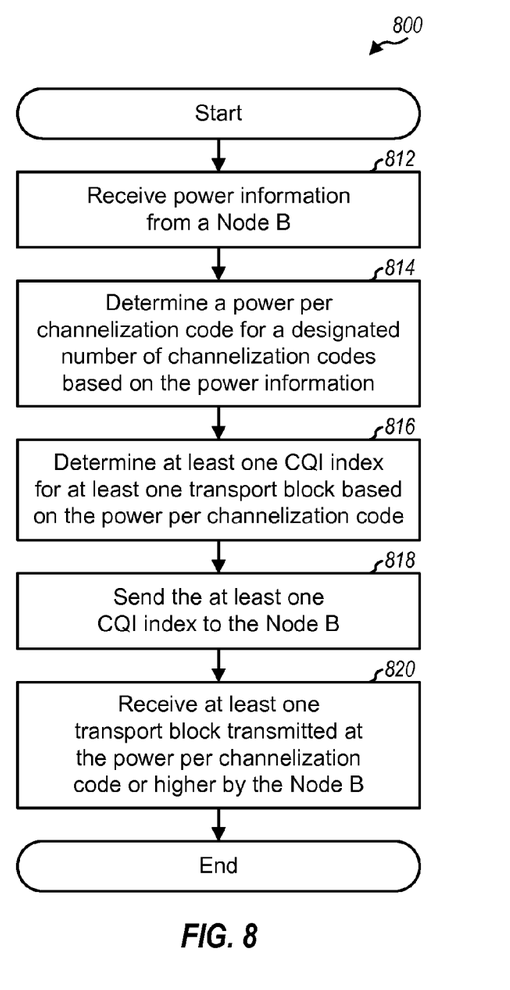
FIG. 8 shows a process performed by the UE.

FIG. 8 shows a design of a process 800 performed by the UE (or a receiver). Power information may be received from the Node B. e.g., in an RRC message or via some other means (block 812). A power per channelization code, $P_{OVSF}$, for a designated number of channelization codes may be determined based on the power information (block 814). In one design of block 814, a power offset may be obtained from the power information, and the received power of a data channel, $P_{HSPDSCH}$, may be determined based on the power offset and the received power of a pilot channel, $P_{CPICH}$, e.g., as shown in equation (2). The power per channelization code, $P_{OVSF}$, may then be determined based on the received power of the data channel, $P_{HSPDSCH}$, and the designated number of channelization codes, e.g., as shown in equation (3).

At least one CQI index for at least one transport block may be determined based on the power per channelization code (block 816). In one design of block 816, at least one SINR of at least one transport block may be estimated based on the power per channelization code. At least one CQI index for at least one transport block may then be determined based on the at least one SINR and may be sent to the Node B (block 818).

At least one transport block may be received from the Node B, with the transport block(s) being transmitted at the power per channelization code, $P_{OVSF}$, or higher by the Node B (block 820). The transport block(s) may be received via a number of available channelization codes and may have size scaled based on the designated number of channelization codes and the number of available channelization codes.

For clarity, the techniques have been described for data transmission using OVSF codes. The techniques may also be used for other types of resources. In general, a Node B may determine power information indicative of total power for a designated number of resource elements with equal power per resource element. The designated number of resource elements may correspond to a designated number of subcarriers, a designated number of channelization codes, a designated number of time slots, a designated number of data streams, a designated number of transport blocks, a designated number of channels, a designated number of antennas, etc. The Node B may send the power information to a UE and may send data with one or more resource elements and at the power per resource element or higher to the UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
a processor; and
a memory coupled to the processor, wherein the memory stores instructions executable by the processor to perform operations comprising:
determining power information indicative of a total power for a designated number of channelization codes with equal power per channelization code, wherein the power information comprises a power offset between the total power for the designated number of channelization codes and a power of a pilot channel, wherein the designated number of channelization codes is different than a number of available channelization codes, and wherein the total power for the designated number of channelization codes is greater than an available power for a data channel; and
sending the power information to user equipment (UE).

2. The apparatus of claim 1, wherein the operations further comprise:
determining the available power for the data channel;
determining the number of available channelization codes for the data channel; and
determining the power information based on the available power, the number of available channelization codes, and the designated number of channelization codes.

3. The apparatus of claim 2, wherein the operations further comprise:
determining the power per channelization code based on the available power and the number of available channelization codes;
computing the total power for the designated number of channelization codes based on the designated number of channelization codes, the number of available channelization codes, and the power per channelization code; and
determining the power information further based on the total power for the designated number of channelization codes.

4. The apparatus of claim 3, wherein the operations further comprise determining the power of the pilot channel.

5. The apparatus of claim 1, wherein the operations further comprise:
receiving at least one channel quality indicator (CQI) index from the UE, wherein the at least one CQI index is determined by the UE based on the power per channelization code, and wherein the at least one CQI index is indicative of at least one processing parameter; and
sending at least one transport block to the UE according to the at least one CQI index.

6. The apparatus of claim 5, wherein the operations further comprise sending the at least one transport block with the designated number of channelization codes and at the power per channelization code or higher to the UE.

7. The apparatus of claim 5, wherein the operations further comprise:
scaling a size of the at least one transport block based on the designated number of channelization codes and the number of available channelization codes; and
sending the at least one transport block with the scaled size using the number of available channelization codes and at the power per channelization code or higher to the UE.

8. The apparatus of claim 5, wherein the operations further comprise:
scaling the power per channelization code based on the designated number of channelization codes and the number of available channelization codes; and
sending the at least one transport block using the number of available channelization codes and at the scaled power per channelization code to the UE.

9. The apparatus of claim 1, wherein the operations further comprise sending each of multiple transport blocks with a common set of channelization codes.

10. The apparatus of claim 1, wherein the designated number of channelization codes is a maximum number of channelization codes available for data transmission.

11. The apparatus of claim 1, wherein the designated number of channelization codes is a fixed number of channelization codes available for data transmission and known a priori by the UE.

12. The apparatus of claim 1, wherein the operations further comprise sending the power information in an information element in a Radio Resource Control (RRC) message to the UE.

13. The apparatus of claim 1, wherein each code of the designated number of channelization codes is a different spreading code.

14. The apparatus of claim 1, wherein each of the designated number of channelization codes is an orthogonal variable spreading factor (OVSF) code.

15. A method for wireless communication, comprising:
determining power information indicative of a total power for a designated number of channelization codes with equal power per channelization code, wherein the power information comprises a power offset between the total power for the designated number of channelization codes and a power of a pilot channel, wherein the designated number of channelization codes is different than a number of available channelization codes, and wherein the total power for the designated number of channelization codes is greater than an available power for a data channel; and
sending the power information to user equipment (UE).

16. The method of claim 15, further comprising determining the power offset based on the total power for the designated number of channelization codes and the power of the pilot channel.

17. The method of claim 15, wherein the power offset is further determined based on the available power for the data channel and the number of available channelization codes.

18. The method of claim 15, further comprising:
receiving at least one channel quality indicator (CQI) index from the UE, the at least one CQI index being determined by the UE based on the power per channelization code, wherein the CQI index is indicative of at least one processing parameter associated with at least one transport block;
processing the at least one transport block according to the at least one CQI index; and
sending the at least one transport block using the designated number of channelization codes and at the power per channelization code or higher to the UE.

19. The method of claim 15, further comprising:
receiving a channel quality indicator (CQI) index for at least one transport block from the UE, wherein the CQI index is determined by the UE based on the power per channelization code, and wherein the CQI index is indicative of at least one processing parameter associated with the at least one transport block;
scaling a size of the at least one transport block based on the designated number of channelization codes and the number of available channelization codes;
processing the at least one transport block with the scaled size according to the CQI index; and
sending the at least one transport block with the scaled size using the number of available channelization codes and at the power per channelization code or higher to the UE.

20. The method of claim 15, further comprising:
sending a first transport block using a set of channelization codes to the UE; and
sending a second transport block using a subset of the set of channelization codes to the UE.

21. An apparatus for wireless communication, comprising:
means for determining power information indicative of a total power for a designated number of channelization codes with equal power per channelization code, wherein the power information comprises a power offset between the total power for the designated number of channelization codes and a power of a pilot channel, wherein the designated number of channelization codes is different than a number of available channelization codes, and wherein the total power for the designated number of channelization codes is greater than an available power for a data channel; and
means for sending the power information to user equipment (UE).

22. The apparatus of claim 21, further comprising means for determining the power offset based on the total power for the designated number of channelization codes and the power of the pilot channel.

23. The apparatus of claim 21, wherein the power offset is further determined based on the available power for the data channel and the number of available channelization codes for the data channel.

24. The apparatus of claim 21, further comprising:
means for receiving a channel quality indicator (CQI) index for at least one transport block from the UE, wherein the CQI index is determined by the UE based on the power per channelization code, and wherein the CQI index is indicative of at least one processing parameter associated with the at least one transport block;
means for processing the at least one transport block according to the CQI index; and
means for sending the at least one transport block using the designated number of channelization codes and at the power per channelization code or higher to the UE.

25. The apparatus of claim 21, further comprising:
means for receiving a channel quality indicator (CQI) index for at least one transport block from the UE, wherein the CQI index is determined by the UE based on the power per channelization code, and wherein the CQI index is indicative of at least one processing parameter associated with the at least one transport block;
means for scaling a size of the at least one transport blocks based on the designated number of channelization codes and the number of available channelization codes;
means for processing the at least one transport block according to the CQI index; and
means for sending the at least one transport block with the scaled size using the number of available channelization codes and at the power per channelization code or higher to the UE.

26. A non-transitory computer-readable storage medium storing instructions executable by a processor to perform operations comprising:
determining power information indicative of a total power for a designated number of channelization codes with equal power per channelization code, wherein the power information comprises a power offset between the total power for the designated number of channelization codes and a power of a pilot channel, wherein the designated number of channelization codes is different than a number of available channelization codes, and wherein the total power for the designated number of channelization codes is greater than an available power for a data channel; and
sending the power information to user equipment (UE).

27. An apparatus for wireless communication, comprising:
a processor; and
a memory coupled to the processor, wherein the memory stores instructions executable by the processor to perform operations comprising:
determining a power offset indicative of a total power for a set of 15 orthogonal variable spreading factor (OVSF) codes with equal power per OVSF code, wherein the set of 15 OVSF codes is different than a set of available channelization codes, and wherein the total power for the set of 15 OVSF codes is greater than an available power for a data channel; and
sending the power offset in a Radio Resource Control (RRC) message to user equipment (UE).

28. The apparatus of claim 27, wherein the operations further comprise:
receiving at least one channel quality indicator (CQI) index for at least one transport block from the UE, the at least one CQI index being determined by the UE based on the power per OVSF code;
processing the at least one transport block based on the at least one CQI index; and
sending the at least one transport block using the set of 15 OVSF codes and at the power per OVSF code or higher to the UE.

29. The apparatus of claim 27, wherein the operations further comprise:
receiving a channel quality indicator (CQI) index for at least one transport block from the UE, wherein the CQI index is determined by the UE based on the power per OVSF code, and wherein the CQI index is indicative of at least one processing parameter associated with the at least one transport block;

scaling a size of the at least one transport block based on the 15 OVSF codes indicative of the power per OVSF code and a number of available OVSF codes;

processing the at least one transport block with the scaled size according to the CQI index; and sending the at least one transport block with the scaled size using the number of available OVSF codes and at the power per OVSF code or higher to the UE.

30. An apparatus for wireless communication, comprising:
a processor; and
a memory coupled to the processor, wherein the memory stores instructions executable by the processor to perform operations comprising:
receiving power information from a Node B;
determining a power per channelization code for a designated number of channelization codes based on the power information, wherein determining the power per channelization code comprises:
obtaining a power offset from the power information;
determining a received power of a data channel based on the power offset and a received power of a pilot channel; and
determining the power per channelization code based on the received power of the data channel and the designated number of channelization codes;
determining at least one channel quality indicator (CQI) index for at least one transport block based on the power per channelization code; and
sending the at least one CQI index to the Node B.

31. The apparatus of claim 30, wherein the operations further comprise:
estimating at least one signal-to-interference-and-noise ratio (SINR) of the at least one transport block based on the power per channelization code; and
determining the at least one CQI index for the at least one transport block based on the at least one SINR.

32. The apparatus of claim 30, wherein the operations further comprise receiving the at least one transport block transmitted by the Node B at the power per channelization code or higher.

33. The apparatus of claim 30, wherein the operations further comprise receiving the at least one transport block via a number of available channelization codes from the Node B, the at least one transport block having a size scaled based on the designated number of channelization codes and the number of available channelization codes.

34. A method for wireless communication, comprising:
receiving power information from a Node B;
determining a power per channelization code for a designated number of channelization codes based on the power information, wherein determining the power per channelization code comprises:
obtaining a power offset from the power information;
determining a received power of a data channel based on the power offset and a received power of a pilot channel; and
determining the power per channelization code based on the received power of the data channel and the designated number of channelization codes;
determining at least one channel quality indicator (CQI) index for at least one transport block based on the power per channelization code; and
sending the at least one CQI index to the Node B.

35. The method of claim 34, wherein determining the at least one CQI index comprises estimating at least one signal-to-interference-and-noise ratio (SINR) of the at least one transport block based on the power per channelization code, and wherein a determination of the at least one CQI index for the at least one transport block is based on the at least one SINR.

36. The method of claim 34, further comprising:
receiving the at least one transport block transmitted at the power per channelization code or higher by the Node B.

37. An apparatus for wireless communication, comprising:
means for receiving power information from a Node B;
means for determining a power per channelization code for a designated number of channelization codes based on the power information, wherein the means for determining the power per channelization code comprises:
means for obtaining a power offset from the power information;
means for determining a received power of a data channel based on the power offset and a received power of a pilot channel; and
means for determining the power per channelization code based on the received power of the data channel and the designated number of channelization codes;
means for determining at least one channel quality indicator (CQI) index for at least one transport block based on the power per channelization code; and
means for sending the at least one CQI index to the Node B.

38. The apparatus of claim 37, further comprising:
means for determining multiple CQI indices, wherein the means for determining multiple CQI indices comprises:
means for estimating at least one signal-to-interference-and-noise ratio (SINR) of the at least one transport block based on the power per channelization code; and
means for determining the at least one CQI index for the at least one transport block based on the at least one SINR.

39. The apparatus of claim 37, further comprising:
means for receiving the at least one transport block transmitted at the power per channelization code or higher by the Node B.

40. A non-transitory computer readable storage medium storing instructions executable by a processor to perform operations comprising:
receiving power information from a Node B;
determining a power per channelization code for a designated number of channelization codes based on the power information, wherein determining the power per channelization code comprises:
obtaining a power offset from the power information;
determining a received power of a data channel based on the power offset and a received power of a pilot channel; and
determining the power per channelization code based on the received power of the data channel and the designated number of channelization codes;
determining at least one channel quality indicator (CQI) index for at least one transport block based on the power per channelization code; and
sending the at least one CQI index to the Node B.

41. The non-transitory computer readable storage medium of claim 40, wherein the operations further comprise receiving the at least one transport block via a number of available channelization codes from the Node B, wherein the at least one transport block is size scaled based on the designated number of channelization codes and the number of available channelization codes.

42. An apparatus for wireless communication, comprising:
means for determining a power offset indicative of a total power for a set of 15 orthogonal variable spreading factor (OVSF) codes with equal power per OVSF code, wherein the set of 15 OVSF codes is different than a set of available channelization codes, and wherein the total power for the set of 15 OVSF codes is greater than an available power for a data channel; and
means for sending the power offset in a Radio Resource Control (RRC) message to user equipment (UE).

43. A method for wireless communication, comprising:
determining a power offset indicative of a total power for a set of 15 orthogonal variable spreading factor (OVSF) codes with equal power per OVSF code, wherein the set of 15 OVSF codes is different than a set of available channelization codes, and wherein the total power for the set of 15 OVSF codes is greater than an available power for a data channel; and
sending the power offset in a Radio Resource Control (RRC) message to user equipment (UE).

44. The method of claim 43, further comprising:
receiving at least one channel quality indicator (CQI) index for at least one transport block from the UE, the at least one CQI index determined by the UE based on the power per OVSF code, wherein the at least one CQI index is indicative of at least one processing parameter associated with the at least one transport block;
sending the at least one transport block using the set of 15 OVSF codes and at the power per OVSF code or higher to the UE; and
processing the at least one transport block according to the at least one CQI index.

45. The method of claim 43, further comprising:
receiving at least one channel quality indicator (CQI) index for at least one transport block from the UE, wherein the at least one CQI index is determined by the UE based on the power per OVSF code, and wherein the at least one CQI index is indicative of at least one processing parameter associated with the at least one transport block;
scaling a size of the at least one transport block based on the set of 15 OVSF codes indicative of the power per OVSF code and a number of available OVSF codes;
sending the at least one transport block with the scaled size using the number of available OVSF codes and at the power per OVSF code or higher to the UE; and
processing the at least one transport block with the scaled size according to the at least one CQI index.

46. A non-transitory computer-readable storage medium storing instructions executable by a computer to perform operations comprising:
determining a power offset indicative of a total power for a set of 15 orthogonal variable spreading factor (OVSF) codes with equal power per OVSF code, wherein the set of 15 OVSF codes is different than a set of available channelization codes, and wherein the total power for the set of 15 OVSF codes is greater than an available power for a data channel; and
sending the power offset in a Radio Resource Control (RRC) message to user equipment (UE).

47. An apparatus for wireless communication, comprising:
a plurality of receivers, wherein each of the plurality of receivers is configured to receive signals from a Node B;
a processor; and
a memory coupled to the processor, wherein the memory stores instructions executable by the processor to perform operations comprising:
determining at least one channel quality indicator (CQI) index for at least one transport block based on a power offset and a designated number of channelization codes, wherein the power offset is a difference between a total power for a data channel and a power of a pilot channel; and
sending the at least one CQI index to the Node B.

48. The apparatus of claim 47, wherein the power offset and the designated number of channelization codes are received from the Node B, and wherein the at least one CQI index is indicative of at least one processing parameter.

49. The apparatus of claim 47, wherein the at least one CQI index is determined based on a power per channelization code for the designated number of channelization codes, and wherein the power per channelization code is determined based on the total power for the data channel and the designated number of channelization codes.

50. The apparatus of claim 47, wherein the at least one CQI index is indicative of a number of transport blocks to be transmitted from the Node B.

51. An apparatus for wireless communication, comprising:
a plurality of receivers, wherein each of the plurality of receivers is configured to receive signals from a Node B;
a processor; and
a memory coupled to the processor, wherein the memory stores instructions executable by the processor to perform operations comprising:
determining a power per channelization code based on a power offset;
determining at least one channel quality indicator (CQI) index for at least one transport block based on the power per channelization code; and
sending the at least one CQI index to the Node B.

52. The apparatus of claim 51, wherein the power per channelization code is associated with a designated number of channelization codes and is further determined based on a total power of a data channel and the designated number of channelization codes, wherein the total power of the data channel is determined based on a power offset and a power of a pilot channel.

53. The apparatus of claim 51, wherein the power per channelization code is associated with a designated number of channelization codes, and wherein the designated number of channelization codes is different from an available number of channelization codes.

54. The apparatus of claim 51, wherein the operations further comprise receiving the at least one transport block transmitted by the Node B at a power level determined based on the power per channelization code.

* * * * *